April 28, 1931.  H. E. McCRERY ET AL  1,802,823
MOLDING METHOD AND APPARATUS THEREFOR
Original Filed June 23, 1926  5 Sheets-Sheet 3
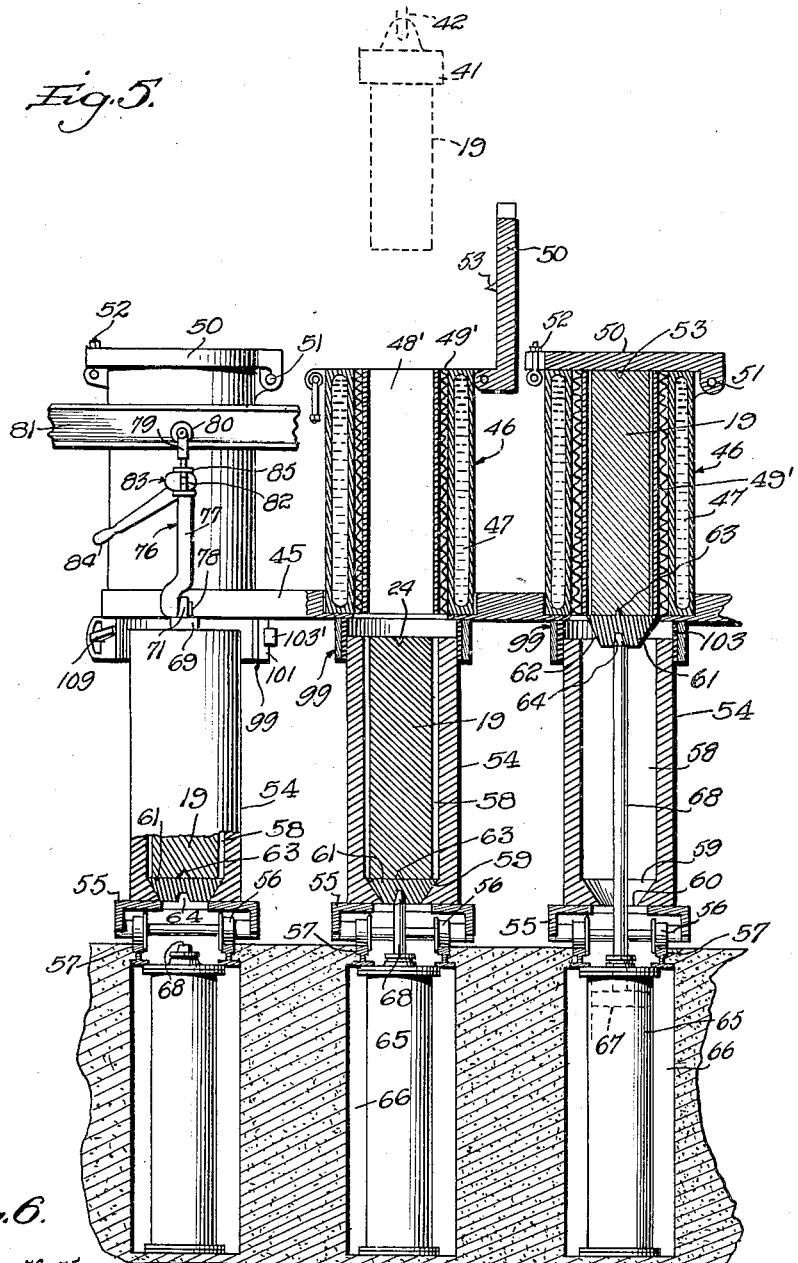
Inventor
H.E. McCRERY
A.E. JESSER
Attorney April 28, 1931. H. E. McCRERY ET AL 1,802,823
MOLDING METHOD AND APPARATUS THEREFOR
Original Filed June 23, 1926  5 Sheets-Sheet 4
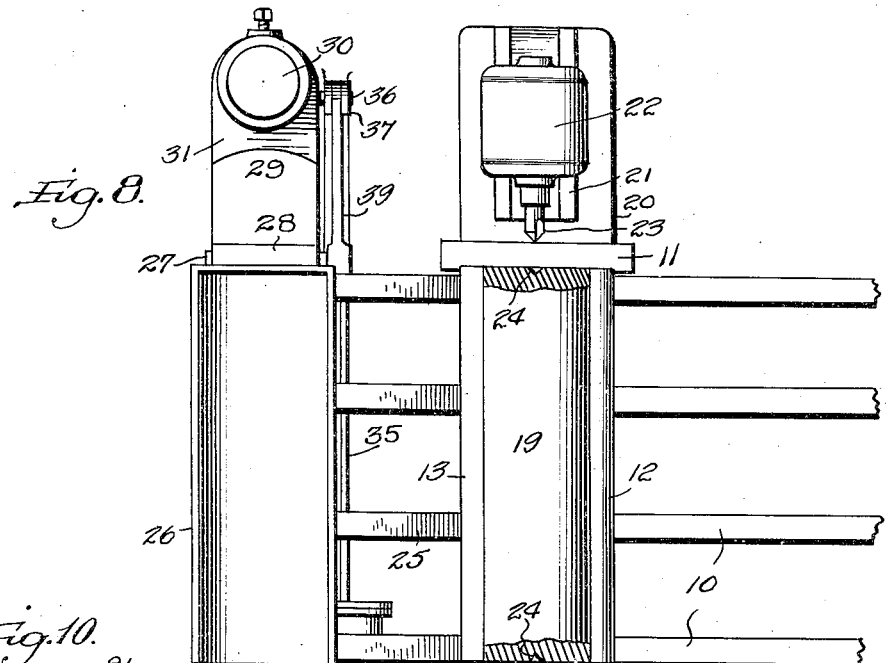
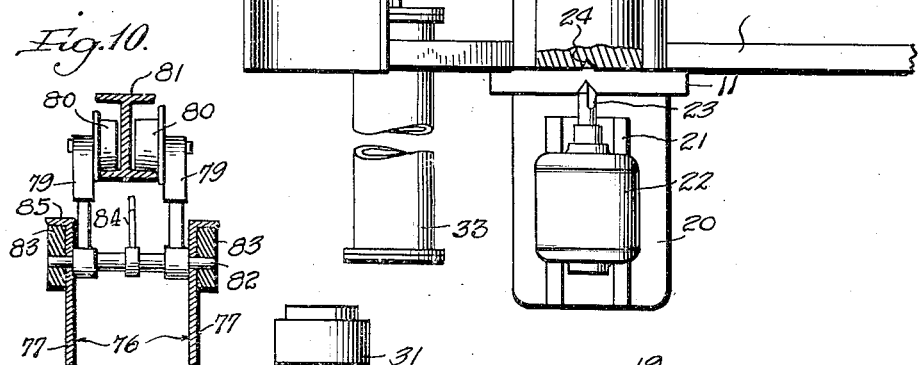
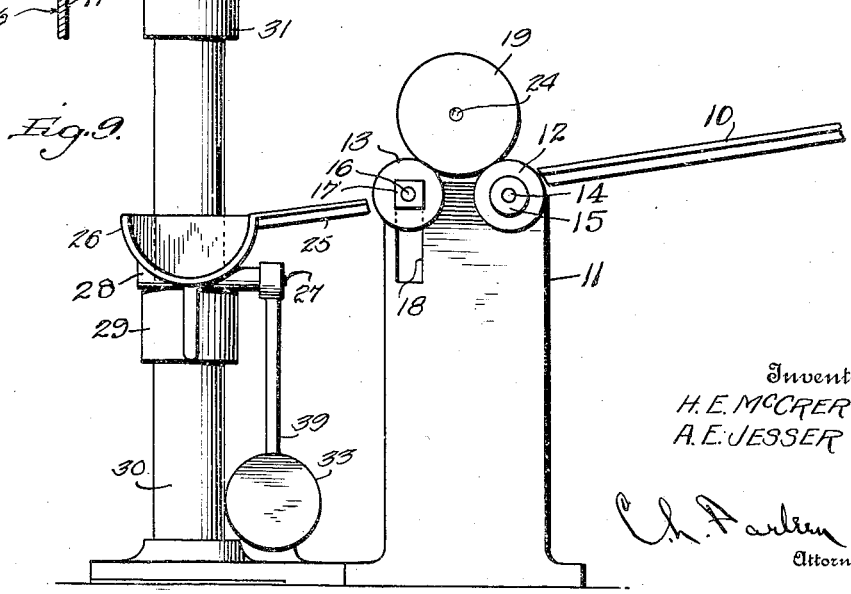

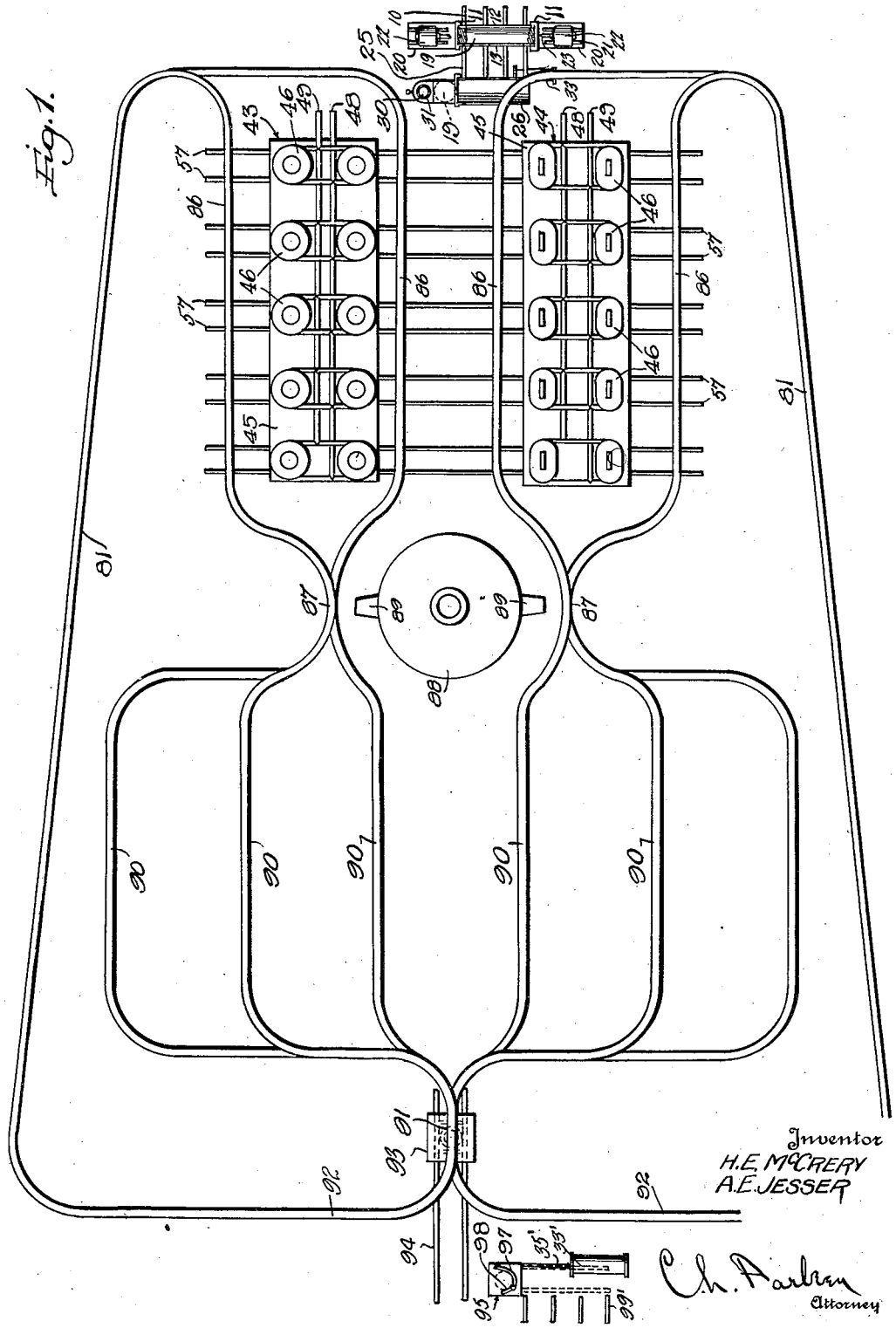

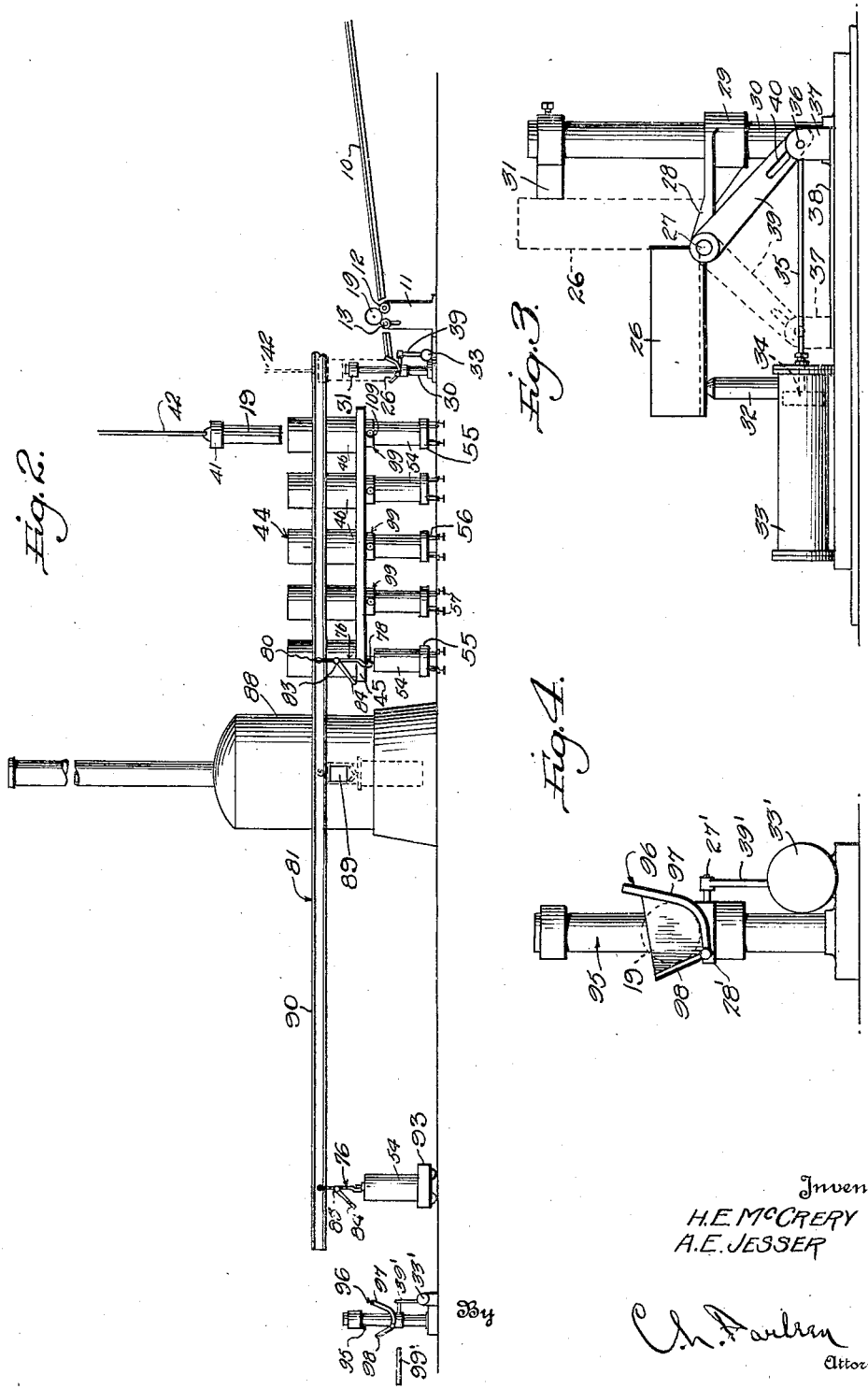

April 28, 1931.    H. E. McCRERY ET AL    1,802,823
MOLDING METHOD AND APPARATUS THEREFOR
Original Filed June 23, 1926    5 Sheets-Sheet 5

Inventor
H.E. McCRERY
A.E. JESSER
By
Attorney

Patented Apr. 28, 1931

1,802,823

UNITED STATES PATENT OFFICE

HAROLD E. McCRERY AND ALBERT E. JESSER, OF APOLLO, PENNSYLVANIA, ASSIGNORS TO COPPERWELD STEEL COMPANY, OF PITTSBURGH, PENNSYLVANIA, A CORPORATION OF PENNSYLVANIA

MOLDING METHOD AND APPARATUS THEREFOR

Original application filed June 23, 1926, Serial No. 118,039. Divided and this application filed December 15, 1927. Serial No. 240,311.

This invention relates to a molding method and apparatus therefor, and more particularly to an apparatus for making bi-metallic billets. The present application is a division of our copending application for Apparatus for manufacturing bimetallic billets, now Reissue Patent No. 17,717, dated June 24, 1930.

In the metal industries it is the usual practice to form bi-metallic billets by casting a jacket of copper about a preheated bar or ingot of steel or the like, but considerable difficulty has been experienced in causing an intimate cohesion of the copper to the ingot due to the formation of oxids on the surfaces of the heated ingot before the casting operation can be completed. This difficulty arises largely because of the time required ordinarily to transfer the ingot from the preheating means to the mold, during which interval the ingot is in contact with the atmosphere. In carrying out the usual operation, an ingot is placed in a mold, the inner walls of which are parallel to and spaced from the surfaces of the ingot, and the molten copper is poured into the mold around the ingot. Considerable difficulty has been experienced in properly retaining the ingots in central position within the molds, and accordingly the copper jacketing of the finished billets usually is of uneven thickness, thus requiring that a number of the imperfect billets be discarded.

In our copending application above referred to, we have disclosed a novel method of heating the ingots prior to the molding operation, and novel heating apparatus, the invention of the copending application above referred to also involving the arrangement of the heating means with respect to the molds to permit the ingots readily to be transferred into the latter. The present invention contemplates a method and apparatus for accomplishing the molding of the copper or other jacketing to form the finished billets.

An important object of the invention is to provide a molding method, wherein the ingots are accurately centered within the molds regardless of any slight warping of the latter under the influence of heat.

A further object is to provide a method of centering the ingots within the molds wherein the ingots are engaged wholly within the areas of their end faces to hold them in proper position.

A further object is to provide novel means for introducing an ingot into a mold in such a way as to discharge air from the mold as the ingot moves thereinto whereby the air may be rarefied and thus minimize the formation of oxids on the surfaces of the ingot.

A further object is to provide a mold having novel means for centering the ingots therein to provide a finished billet having a copper or other jacketing of substantially uniform thickness.

A further object is to provide a mold having a movable portion upon which the ingot is supported when in the mold, such movable portion being adapted to facilitate the introduction of the ingot into the mold.

A further object is to provide a mold having an opening extending therethrough and into the top of which an ingot is adapted to be introduced and to provide movable means adapted to form a closure for the lower end of the mold, and movable to facilitate the introduction of the ingot into the mold.

A further object is to provide a mold of the character referred to having a block normally arranged in the bottom of the mold to form a closure therefor and to support the ingot therein, the block being substantially equal in diameter to the interior of the mold and movable from an upper position to introduce the ingot thereinto, downward movement of the block being adapted to force air from the mold to rarefy the air therein and thus minimize the formation of oxids on the surfaces of the ingot.

A further object is to provide a mold having a vertical opening extending therethrough and restricted at its lower end to form a shoulder, and to provide means vertically movable into the mold, to introduce a billet thereinto, the vertically movable means being adapted to seat on the shoulder to form a closure for the lower end of the mold, and being adapted during its downward movement to discharge air from the mold.

A further object is to provide an apparatus of the character referred to wherein the vertically movable member is provided with means adapted to engage the lower end of the ingot to maintain it in central position in the mold, and to provide novel means adapted to similarly center the upper end of the ingot within the mold without interfering with the introduction of the molten metal to form the finished billet.

Other objects and advantages of the invention will become apparent during the course of the following description.

In the drawings we have shown one embodiment of the invention. In this showing,

Figure 1 is a plan view for the apparatus,

Figure 2 is a side elevation of the same,

Figure 3 is a side elevation of the ingot elevating device,

Figure 11:
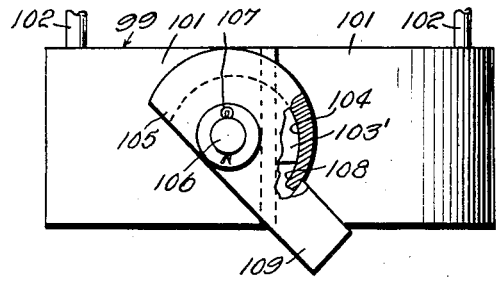
Figure 13:
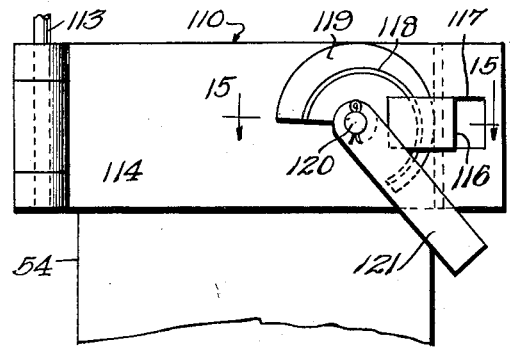
Figure 12:
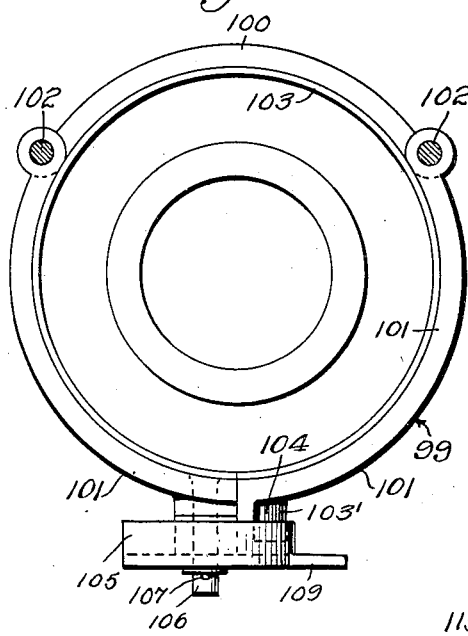
Figure 14:
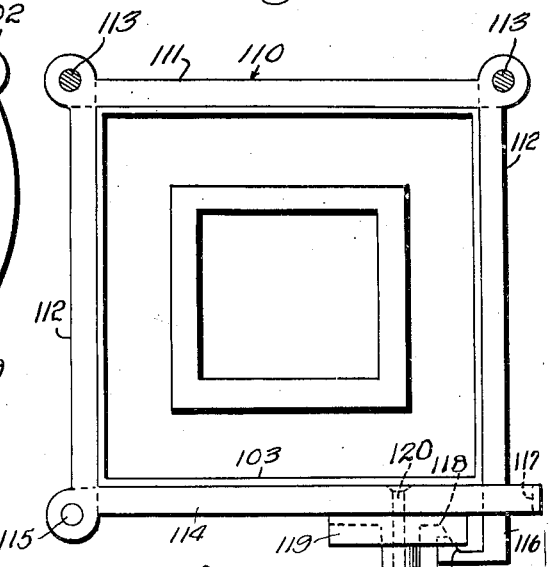
Figure 15:
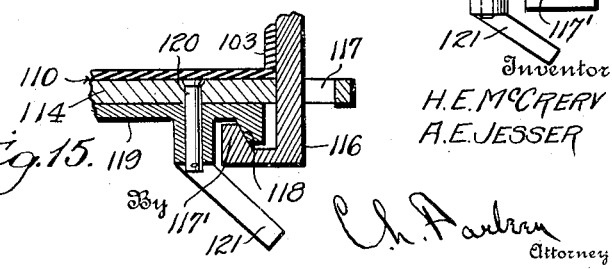

Figure 4 is an end elevation of a somewhat similar device employed when discharging the billets from the molds, Figure 5 is a central vertical sectional view through a plurality of molds, heating units and associated elements, parts being shown in elevation, Figure 6 is a detail sectional view through the upper end of one of the molds, Figure 7 is a plan view of one of the molds, Figure 8 is an enlarged plan view of the center hole forming means and associated elements, parts being shown in section, Figure 9 is a side elevation of the same, parts being omitted, Figure 10 is a detail view of the mold lifting device, Figure 11 is a front elevation of one form of heat retaining means, parts being broken away, Figure 12 is a plan view of the same, Figure 13 is a front elevation of a modified form of heat retaining device, Figure 14 is a plan view of the same, and, Figure 15 is a detail sectional view on the line 15—15 of Figure 13.

Referring to Figures 1 and 2 the numeral 10 designates a gravity or other conveyor adapted to convey the base bars or ingots to the center hole forming means. As shown, a pair of standards 11 is arranged near the discharge end of the conveyor and are adapted to support rolls 12 and 13. The roll 12 is provided at opposite ends with stub shafts 14 rotatable in fixed bearings 15 carried by the standards 11, while the roll 13 is similarly provided with stub shafts 16 mounted in bearings 17 which are vertically movable in slots 18. Any suitable means may be employed for effecting the vertical movement of the roll 13 for a purpose to be described. The rolls 12 and 13 form supporting means for each successive base bar or ingot 19, as shown in Figure 9.

Each standard 11 is preferably provided with a horizontal support 20 projecting outwardly therefrom and provided with guides 21. A motor 22 is mounted to reciprocate in the guides of each support 20 and each motor is adapted to drive a countersink 23 or similar drilling device adapted to be moved into contact with the ends of the ingots to provide center holes therein. The rolls 12 and 13 are preferably placed in such a position that when an ingot of given size is arranged thereon, the axis of the ingot will coincide with the axes of the motors 22.

It will be obvious that lowering of the roll 13 will discharge each successive ingot from the rolls 12 and 13, and a suitable conveyor 25 is provided for supporting the discharged ingots and conveying them to a receiver 26. This receiver is substantially semi-circular in cross section, as clearly shown in Figure 9. The receiver 26 is secured at one end to a shaft 27 journaled in a bearing 28 carried by a supporting bracket 29. The bracket 29 is secured to a post or standard 30 which is provided with a stop 31 at its upper end for a purpose to be described. The free end of the receiver 26 is normally supported upon a stationary post 32. Means is provided for raising the ingots to a vertical position by swinging the receiver 26, for a purpose to be described. As shown, a cylinder 33 is provided with a piston 34 secured to a piston rod 35, and reciprocation of the piston is accomplished by the introduction of compressed air on opposite sides of the piston by suitable pipes (not shown). The opposite end of the piston rod 35 is secured to a pin 36 carried by a cross head 37 mounted to reciprocate in guides 38. An arm 39 is secured to the shaft 27, and this arm is provided in its opposite end with a slot 40 through which the pin 36 projects. It will be apparent that introduction of pressure into the right end of the cylinder 33, as viewed in Figure 3, will draw the piston 34 toward the left, thus swinging the arm 39 to the dotted line position and elevating the receiver 26 to a vertical position, the ingot in the receiver contacting with the stop 31 to limit its movement.

After the ingot has been elevated to a vertical position, means is provided for lifting the ingot and inserting it into one of the heating units to be described. For elevating the ingots, we provide an electro-magnet 41 suspended from a cable 42. This cable may be connected at its upper end to a suitable carriage movable along an ordinary overhead trackway (not shown). While we have described the use of an electro-magnet, we prefer to use such a lifting device merely as a matter of convenience, and may employ any suitable lifting means as will be apparent.

Referring to Figure 1, the numerals 43 and 44 designate a pair of batteries of heating units suitably supported in frames 45 a substantial distance above the floor, as shown in Figure 5. These batteries may be duplicates of each other, or may be formed in any desired shape according to the cross sectional shapes of the ingots. In Figure 1, we have illustrated the heating units 43 as adapted to receive circular ingots, while the battery 44 is adapted to receive ingots which are oblong in cross sectional shape. Aside from the difference in cross sectional shapes, the batteries 43 and 44 are identical, and only one battery need be described in detail.

Referring to Figures 1 and 5, each battery 43 and 44 consists of a plurality of heating units each of which is designated as a whole by the numeral 46. Each heating unit comprises a metallic casing the outer portion of which is surrounded by a water jacket 47, water being supplied to the jackets through a manifold 48 and drawn off from the jackets through a manifold 49. Each unit is provided with a central opening 48', and the unit is adapted to be heated by coils 49' of any suitable type. Each unit is provided with a cover 50 hinged at one side to the unit as at 51, the opposite side of each cover being adapted to be secured in closed position by a clamping bolt 52. Each cover 50 is provided on its lower face with a conical central projection 53 arranged co-axial with the opening 48' when the cover is closed.

As illustrated in Figure 1, each battery 43 and 44 consists of two lines of heating units for convenience in operating the apparatus, as will become apparent. Molds designated as a whole by the numeral 54 are adapted to be brought into position beneath the heating units 46, one mold preferably being provided for each of the heating units. The molds are preferably mounted upon what are known in the art as "buggies" indicated in the drawings by the numeral 55. One buggy is provided for each of the molds and is mounted upon wheels 56 traveling upon rails 57. The rails extend transversely of the apparatus, as shown in Figure 1, each buggy when removed from beneath its corresponding heating unit, being moved outwardly with respect to each battery of heating units, along the rails 57.

Each mold is provided with an axial receiving opening 58 corresponding generally in shape and size to the openings 48' of the heating units. At its lower end, each mold is provided with a conical depression 59 having an open lower end 60. A plunger or supporting member 61 is arranged in each of the molds, and each of these plungers is provided with a conical face 62 adapted to seat against the surface 59. The plungers 61 substantially snugly fit within the molds, and obviously will be centered therein. Each of the plungers is provided on its upper face with a conical elevation 63 arranged coaxially with the mold, and the lower face of each plunger is provided with a recess 64 for a purpose to be described. Each of the molds is preferably of the split type comprising a pair of complementary sections which may be separated to permit the finished billets to be removed therefrom. The split feature of the mold is in itself old and well known and no detailed description thereof is believed to be necessary.

Each mold is adapted to be brought into axial alinement with its corresponding heating element as previously described, and means are provided for elevating the plungers to form closures for the lower ends of the heating elements and supports for the ingots therein. As shown in Figure 5, a cylinder 65 is arranged in a recess 66, beneath and in axial alinement with each of the heating units. Each cylinder is provided with a plunger or piston 67 secured to the lower end of a piston rod 68, the upper end of which is adapted to be received in one of the recesses 64. Means (not shown) is provided for introducing compressed air or other fluid into the lower ends of the cylinders 65 to elevate the pistons 67 as will be apparent. When pressure is released from the lower ends of the cylinders, the piston rods 68 will assume the position shown in the left hand side of Figure 5 of the drawings. Thus it will be apparent that when the pistons 67 are withdrawn the buggies 55 are freely movable along the rails. From the drawings it will be apparent that each mold, when in operative position, is arranged beneath and adjacent its corresponding heating device whereby a bar lowered from a heating device into the mold will not come into substantial contact with the atmosphere, thus minimizing the formation of oxids on the surface of the bar. However, we prefer to provide means for excluding air from the bar during the transferring operation, this means being described later.

It will be apparent that when one of the pistons 67 is lowered to normal position, the plunger 61 associated therewith is adapted to support the ingot within the corresponding mold, and means is provided for closing the upper end of the mold as shown in detail in Figures 6 and 7. As shown, a cover 69 is provided with openings 70 through which project ears 71 carried by the upper end of each mold. These ears are provided with openings 72 for a purpose to be described. A screw 73 projects through each cover 69 and is provided at its lower end with a conical extremity 74 adapted to engage within one of the center holes of the ingot as shown. An operating handle 75 is adapted to rotate the screw 73 as will be apparent.

After one of the molds is closed, as shown in Figure 6, it is moved from beneath its corresponding heating unit by rolling the buggy 55 along the rails 57. The mold is then adapted to be picked up by an elevating device 76 which comprises a pair of depending arms 77 having hooks 78 at their lower ends. These hooks are arranged substantially horizontally and are received in the openings 72 whereby the mold may be lifted and the cover 69 maintained in closed position. A suspension member 79 (see Figure 5) is connected to wheels 80 which are adapted to run upon rails designated as a whole by the numeral 81. The suspension member is provided with a transverse pin 82 which supports cams 83 adapted to be operated by a lever 84. The cams are adapted to contact with lateral projections 85 carried by the arms 77 whereby the latter may be elevated to lift the mold from its buggy when the lever 84 is swung in one direction.

The track 81 is provided with sections 86 arranged on opposite sides of each battery 43 and 44. These track sections are adapted to permit the elevating devices to be brought in proximity to any set of rails 57 as will be apparent. The rail sections 86 are brought to converging points 87 upon opposite sides of a furnace 88 which normally maintains a body of metal in a molten condition, the metal being adapted to be discharged from the furnace through spouts 89. From each converging point 87 the rails lead to additional sections 90 which serve as cooling racks for a purpose to be described. From the cooling racks the rails again converge to the point 91, and outwardly of the point 91 rail sections 92 are provided for returning the molds to their normal positions on the buggies supported on the rails 57.

Beneath the rail point 91 and additional auxiliary buggy 93 is arranged, and this buggy is adapted to roll upon rails 94. The lowering device indicated as a whole by the numeral 95 is arranged adjacent the outer end of the rails 94. The lowering device is similar to the device previously described for elevating the ingots to a vertical position after the center holes have been drilled therein, and accordingly the lowering device need not be described in detail. Certain parts of the lowering device similar to corresponding parts of the elevating device are designated by corresponding reference numerals each having a prime affixed. In place of the receiver 26, the lowering device 95 is provided with a receiver 96 having a fixed section 97 and a hinged section 98 which may be retained in the operative position shown in Figure 4 by any suitable means. The receiver 96 is adapted to be lowered from the vertical position shown in Figure 1 to the horizontal position shown in Figure 4 whereupon the movable section 98 may be lowered to discharge the billets upon a take-off conveyor 99'.

In Figures 11 to 15 inclusive, we have shown means for excluding air from the bar when it is transferred from a heating unit to one of the molds. As shown, the numeral 99 designates an air excluding device adapted for use in connection with one of the circular molds. The device 99 comprises a rear section 100 and a pair of front sections 101. Pivot pins 102 connect the rear section 100 with the forward sections 101, and the pins 102 extend upwardly as shown in Figure 11 for connection with the lower end of one of the heating units. The device 99 is circular as previously stated and one of the devices is arranged in axial alinement with each of the heating units. It will be apparent that one of the devices 99 is permanently secured against the lower end of each heating unit by the pivot pins 102. The device 99 is lined with a heat resisting material 103, and in practice we prefer to provide a lining formed of asbestos or the like. It will be obvious that the device 99 must be opened to permit a mold to be withdrawn therefrom, and accordingly the forward sections 101 are adapted to swing outwardly to permit the mold to be removed, the outward swinging of the sections 101 being permitted by the pivot connections between the sections 100 and 101. In Figure 5 of the drawings we have shown two of the heat retaining devices 99 arranged in operative position, another of these devices being shown open at the left side of Figure 5, to permit the mold to be withdrawn. It will be obvious that when one of the devices is closed, it is clamped firmly about its corresponding mold to exclude air therefrom. Means are provided for clamping the free ends of the forward sections 101 together. As shown, one of the sections 101 is provided with a lug 103' having an arcuate outer face 104. A locking member 105 is pivotally connected to the free end of the other section 101 by a pin 106, the lock being retained in position by a cotter pin or other fastening device 107. The locking device is provided with an inner arcuate recess 108 having a wall arranged eccentric to the pin 106 to engage the arcuate face 104 of the lug 103'. The locking device is provided with an operating handle 109 to permit it to be revolved.

In Figures 13 to 15 inclusive, we have shown a heat retaining device 110 adapted for use in connection with square molds, but it will be apparent that the device easily can be altered to accommodate any desired form of mold. The device 110 includes a stationary section 11 at the rear thereof and movable side sections 112. The adjacent ends of the sections 111 and 112 are pivotally connected by pins or rods 113, the upper ends of which project upwardly as shown in Figure 13, for connection with one of the heating devices whereby the device 110 may be rigidly secured thereto.

A movable front section 114 is hinged to the forward end of one of the sections 112 by a pivot pin 115. The forward end of the other section 112 is provided with an extension 116 which projects through an opening 117 formed in the free end of the section 114. The projecting end 116 is provided with a lug 117' which is adapted to be engaged by an eccentric cam face 118 carried by a locking member 119. The locking member is pivoted to the free end of the section 114 by a pin 120 and is provided with an operating handle 121.

The operation of the apparatus is as follows:

The ingots are preferably provided with etched surfaces whereby the copper coating to be applied may more firmly engage the surface of the ingot. The etching operation may be performed in any desired manner and forms no part of the present invention. The etched ingots are fed to the rolls 12 and 13 one at a time, and while one of the ingots is in the position shown in Figure 9, the motors 22 are moved inwardly to drill the center holes 24. The roll 13 is then lowered and the ingot is discharged upon the conveyor 25 which conveys it to the receiver 26. Air is then admitted into the cylinder 33 to elevate the receiver in the manner previously described, whereupon the electro-magnet 41 is lowered to pick up the ingot.

Air is admitted into one of the cylinders 65 to elevate the piston 67 therein to the position shown at the right side of Figure 5, the plunger 61 in the mold being elevated by the piston rod 68 as the latter is elevated. It will be apparent that the piston rod is freely movable through the lower end of the mold to elevate the plunger, and the latter when elevated contacts with and forms a closure for the lower end of the heating unit. With the cover 50 of the heating unit open, the electro-magnet is moved over the heating unit and lowered whereby the ingot is inserted into the mold and supported upon the plunger 61. The cover 50 is then closed and bolted, and it will be apparent that the conical projections 53 and 63 of the cover 50 and plunger 61 properly center the ingot within the heating unit. Heat is supplied by the heating coils until the temperature of the ingot is raised to the proper point. This operation usually requires about fifteen or twenty minutes, and upon completion of the heating operation, the air is exhausted from the lower end of the cylinder 65, thus permitting the plunger 61 and the ingot to move downwardly by gravity into the mold opening 58. It will be obvious that the heating operation is carried on with the ingot substantially out of contact with the atmosphere whereby oxidation is materially reduced, and upon completion of the heating operation the ingot is immediately introduced into the mold. As previously stated, the plunger 61 fits snugly within the mold 58, but is slidable therein. The ingot is supported on the plunger 61, and it will be obvious that when the piston rod 68 moves downwardly, the plunger and the ingot will be lowered into the mold. Downward movement of the plunger 61 forces air from the mold through the opening in the lower end of the mold as will be obvious. With the cover 50 closed, and one of the air excluding devices 99 in position, it will be apparent that the plunger 61 acts to exhaust air from the mold thus reducing the pressure of air in the mold and rarefying the air thus substantially eliminating oxidation of the ingot. The air excluding devices also retain the heat in the ingot until such time as the mold is removed to permit the copper or other metal to be poured around the ingot. The heat from the ingot expands what little air remains in the mold so that very little additional air will flow therein after the heat retaining device is removed. The member 99 readily may be removed by revolving the handle 109 to release the cam 108 from the lug 103', whereupon the movable sections 101 may be swung outwardly as indicated at the left side of Figure 5. It will be obvious that the heat retaining device 110 may be operated in a similar manner, the movable sections 112 and 114 being swung outwardly by releasing the locking device 119. After the plunger 61 is moved to its lowermost position, and the heat retaining device is open, the buggy upon which the mold rests may be withdrawn from beneath the heating unit and the cover 69 applied in the manner previously described. The handle 75 is turned to cause the conical end of the screw 73 to enter the center hole 24 at the upper end of the ingot, whereby it will be apparent that the latter is firmly centered in the mold and maintained in its central position throughout the remainder of the operation. The handle 84 is elevated to lift the mold far enough to clear the buggy whereupon the mold may be removed along the rail section 86 to one of the converging points 87. As shown in Figure 7, the cover 69 is relatively narrow, leaving the space between the ingot and the mold walls open, whereupon the molten copper or other metal may be poured into this space from one of the spouts 89. After the mold is filled, it may be removed to one of the cooling rack rail sections 90 where it is permitted to remain until the temperature of the copper jacket is lowered sufficiently to permit it to solidify. The mold is then moved to the rail point 91 whereupon the handle 84 is lowered thereby depositing the mold upon the buggy 93. The buggy 93 is then moved outwardly along the rails 94 to a point opposite the receiver 96, and with the latter in vertical position, the billet is moved thereinto either manually or otherwise, after which the receiver is lowered to a horizontal position and the completed billet is discharged upon the conveyor 99'.

It will be obvious that all of the heating units and molds may be succesively and continuously operated to prepare the ingots for the casting operation, a plurality of the heating units and molds being provided in order that the operations may be substantially continuously carried out.

In the use of the apparatus it has been found that the formation of oxids on the ingots while in the heating units is substantially entirely eliminated. Particular attention is invited to the operation of the plunger or block 61 as means for forcing air from the bottom of the mold opening as the block and ingot are lowered. This operation tends to rarefy the air in the mold, and the heat from the billet raises the temperature of the little air remaining in the mold thus expanding it and causing it to fill the space surrounding the ingot. Thus it will be seen that very little additional air will be drawn into the mold and the ingot will be protected against oxidation.

Changes in temperature of the molds cause them to warp slightly and this warping ordinarily affects the thickness of the copper jacketing owing to the shifting of the position of the ingots with respect to the molds. With the present invention, however, the coöperation between the center projections 53 and 63 with the center openings of the ingots causes the latter to be held in fixed axial alinement with the mold and accordingly a jacketing of substantially uniform thickness is provided.

From the foregoing it will be apparent that we provide a method of casting bi-metallic billets wherein the ingot is supported centrally within the mold by engagement with the end faces of the ingot within the areas thereof, thus permitting an unbroken jacket to be cast around the ingot throughout its length. It also will be apparent that the method contemplates the simultaneous introduction of an ingot into the mold and the forcing of air therefrom, thus minimizing the formation of oxids on the ingot.

It is to be understood that the form of the invention herewith shown and described is to be taken as a preferred example of the same and that various changes in the shape, size and arrangement of parts may be resorted to without departing from the spirit of the invention or the scope of the subjoined claims.

We claim:

1. The method of casting bi-metallic billets which consists in introducing a core into a mold, engaging the core wholly within the area of its end faces to position it in the mold spaced from the walls thereof, and pouring metal into the mold around the core.

2. The method of casting bi-metallic billets which consists in introducing a heated core into one end of a mold and simultaneously displacing substantially all of the air in the mold from the opposite end thereof, and pouring metal into the mold around the core.

3. Apparatus of the character described comprising a mold having an opening therethrough, a member movable through said opening and normally forming a closure for one end thereof, and a projection carried by said member substantially centrally thereof and adapted to engage one end face of a core to assist in positioning it in said mold.

4. Apparatus of the character described comprising a mold having a vertical opening therethrough, a member movable through said opening and normally forming a closure for the lower end thereof, said member corresponding in shape and size to said opening, and a projection carried by said member substantially centrally thereof and adapted to engage one end face of the core to assist in positioning it in the mold.

5. Apparatus of the character described comprising a vertical body having an axial opening therethrough, a closure member for the lower end of said opening and movable therethrough, a head adapted to be secured in position against the upper end of said body, and positioning means carried by said member and said head and adapted to engage wholly within the areas of the end faces of a core arranged in the body.

6. A mold comprising a vertical body having an axial opening therein adapted to receive a core inserted in the upper end thereof, the upper end of said mold being provided with upwardly extending ears having openings therein, a crosshead having openings adapted to receive said ears and having a portion engageable with the core to center it in said body, and means for lifting said mold from said supporting means, said lifting means including hooks adapted to be inserted in the openings in said ears and to contact with the upper face of said crosshead to retain the latter in position.

7. A mold comprising a vertical body having an axial opening therein adapted to receive a core inserted in the upper end thereof, the upper end of said mold being provided with upwardly extending ears having openings therein, a crosshead having openings adapted to receive said ears and having a portion engageable with the core to center it in said body, hooks adapted to be inserted in the openings in said ears and to contact with the upper face of said crosshead to retain the latter in position, and means for lifting said hooks.

8. A mold comprising a vertical body having an axial opening therethrough, a closure member for the lower end of said opening provided on its upper face with a projection adapted to be received in an opening formed in a core arranged in the mold, a head secured in position against the upper end of said mold, and a screw threaded in said head, the lower end of said screw being adapted to be received in an opening formed in the upper end of the core, the lower end of said screw and the projection on the upper face of said closure member being adapted to retain the core centered in and spaced from the walls of the opening in said mold.

9. A mold comprising a body having an opening therein, and means for introducing a core into one end of said opening, a portion of said means being adapted to substantially entirely displace air from the mold simultaneously with the introduction of the core therein.

10. A mold comprising a body having a vertical opening therethrough, and vertically movable means adapted simultaneously to lower a core into the opening through the upper end thereof and to substantially entirely discharge air from the opening through the lower end thereof.

11. The method of casting bi-metallic ingots, which consists in introducing a core into a mold, engaging the core in such manner that the side faces thereof are untouched, the engagement being effective for properly positioning the core in the mold, and pouring metal into the mold around the core.

12. A mold for casting metal, comprising a shell, a member movable through the shell and adapted to form a closure therefor, and means on such member for centering a core within the shell.

13. A mold for casting metal, comprising a shell, a member substantially fitting within the shell but movable therethrough and adapted to form a closure therefor, and means on such member for centering a core within the shell.

14. A mold for casting metal comprising a shell, a piston-like member fitting within the shell and adapted to slide therethrough and to form a closure therefor, and means on said member for centering a core within the shell.

15. A mold for casting metal, comprising a shell, and means for engaging a core within the shell at the top and bottom of the core, and having means projecting longitudinally of the mold for insuring proper positioning of the core within the mold, and providing a pouring space for pouring metal into the mold between the shell and core.

16. Apparatus of the character described comprising a vertical body having an axial opening therein, a head adapted to be secured in position against the upper end of said body and engageable with a core arranged in said body to position the core therein, and lifting means adapted for connection with said body, said lifting means being engageable with said head to maintain it in operative position.

17. Apparatus of the character described comprising a vertical body having an axial opening therethrough, a closure member for the lower end of said opening and movable therethrough, a head adapted to be secured in position against the upper end of said body, said closure member and said head being engageable with the end faces of a core arranged in said body to maintain said core in position therein, and lifting means adapted for connection with said body, said lifting means having portions engageable with said head to maintain it in operative position.

18. A method of forming a bi-metallic billet, comprising moving a core into a mold, simultaneously passing within such mold immediately ahead of the core a device substantially conforming with the mold to displace substantially all of the contents thereof in the direction of movement of the core, and pouring metal into the mold around the core.

19. A method of placing a core in a mold of substantially greater cross-sectional area than the core, comprising moving within the mold a device of substantially the same cross-sectional area as the mold whereby to displace substantially all of the contents of the mold in the direction of movement thereof, and introducing the core into the mold immediately behind the same.

In testimony whereof we affix our signatures.

HAROLD E. McCRERY.
ALBERT E. JESSER.